United States Patent
Sodabathina et al.

(10) Patent No.: US 12,328,309 B1
(45) Date of Patent: Jun. 10, 2025

(54) PATTERN BASED SECURITY ASSERTION MARKUP LANGUAGE (SAML) ACCESS

(71) Applicant: Amazon Technologies, Inc., Seattle, WA (US)

(72) Inventors: Raghavarao Sodabathina, Westborough, MA (US); Imtiaz Sayed, Frisco, TX (US)

(73) Assignee: Amazon Technologies, Inc., Seattle, WA (US)

( * ) Notice: Subject to any disclaimer, the term of this patent is extended or adjusted under 35 U.S.C. 154(b) by 236 days.

(21) Appl. No.: 17/849,500

(22) Filed: Jun. 24, 2022

(51) Int. Cl.
*H04L 9/40* (2022.01)

(52) U.S. Cl.
CPC ................... *H04L 63/083* (2013.01)

(58) Field of Classification Search
None
See application file for complete search history.

(56) References Cited

U.S. PATENT DOCUMENTS

| | | | | |
|---|---|---|---|---|
| 2002/0144119 | A1* | 10/2002 | Benantar | H04L 9/3263 713/171 |
| 2006/0129935 | A1* | 6/2006 | Deinlein | G06Q 10/10 707/E17.107 |
| 2006/0218625 | A1* | 9/2006 | Pearson | H04L 63/0428 726/4 |
| 2018/0032219 | A1* | 2/2018 | Kirov | H04L 67/55 |
| 2024/0154968 | A1* | 5/2024 | Kwon | H04L 63/102 |

OTHER PUBLICATIONS

<https://servicedesk.lavamobiles.com/Summitweb/OnlineHelp/CMN/Admin/General/SSO_Configuration__Google.htm>. Published Jun. 7, 2017 (Year: 2017).*
<https://learn.microsoft.com/en-us/answers/questions/24259/identify-saml-enabled-apps-in-azure-ad> Posts from Nov. 22, 2001 and prior. (Year: 2021).*

* cited by examiner

*Primary Examiner* — Scott B Christensen
(74) *Attorney, Agent, or Firm* — Knobbe, Martens, Olson & Bear, LLP

(57) ABSTRACT

The present disclosure generally relates to systems and methods for configuring Security Assertion Markup Language (SAML) access network-based services. An identity provider can authenticate the customer and provide SAML authentication information to a SAML configuration service. Based on the customer's authentication information, the SAML configuration service can discover SAML-enabled services and analyze the customer's usage pattern of each discovered service. The SAML configuration service may prioritize the discovered services based on the analysis and transmit a list of the discovered services to the customer based on a sequence of the prioritization. The SAML configuration service also can configure SAML configuration associated with each SAML-enabled service by identifying one or more parameters and applying parsing rules.

22 Claims, 8 Drawing Sheets

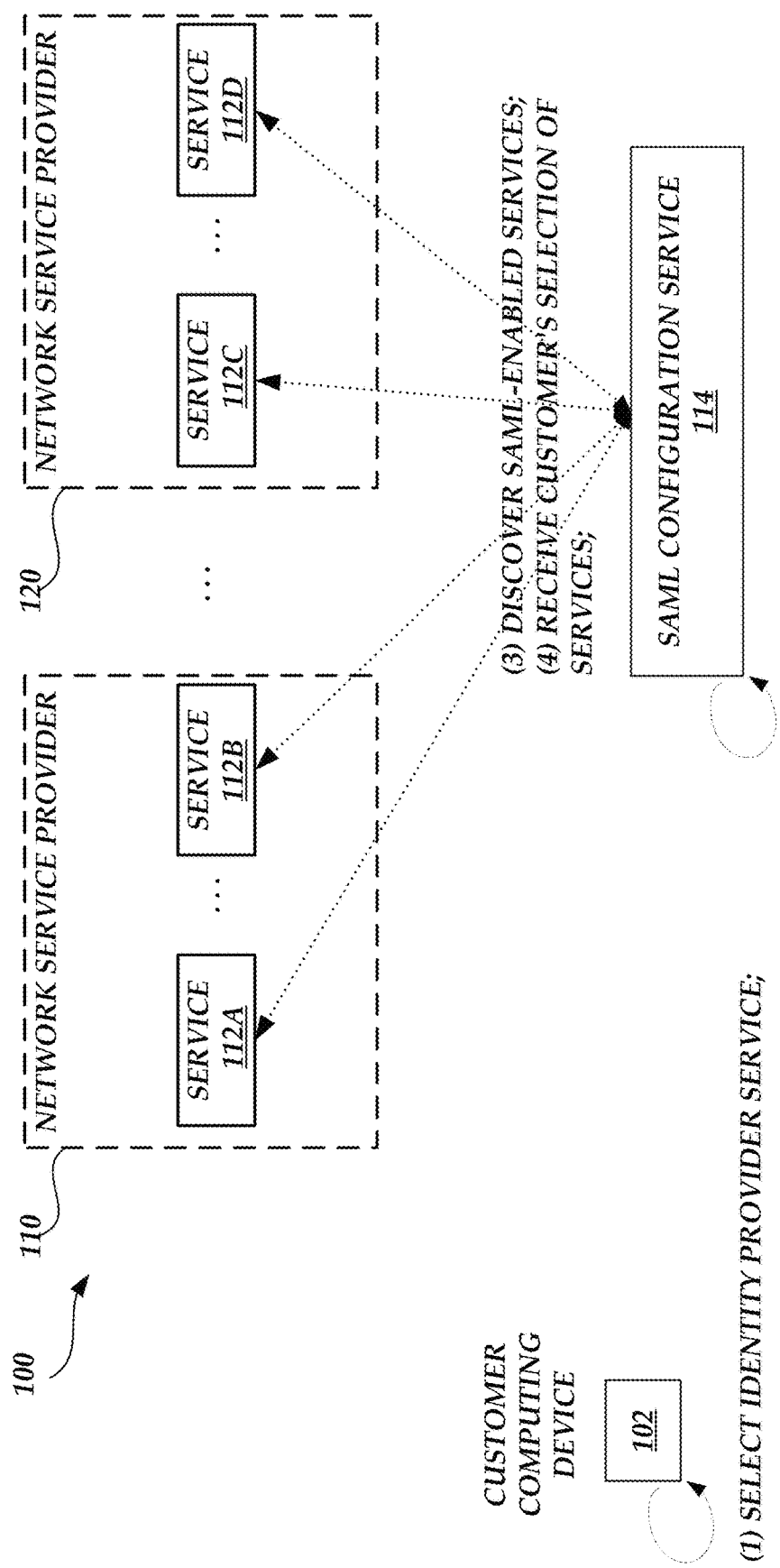

PATTERN BASED SECURITY ASSERTION MARKUP LANGUAGE (SAML) ACCESS

BACKGROUND

Generally described, external computing devices and communication networks can be utilized to exchange data and/or information. In a common application, an external computing device can request content from another external computing device via the communication network. For example, a user having access to an external computing device can utilize a software application to request content or access network-hosed applications/functionality from an external computing device via the network (e.g., the Internet). Additionally, the external computing device can collect or generate information and provide the collected information to a network-based customer computing device for further processing or analysis. The external computing device can be referred to as a customer computing device.

In some embodiments, a network service provider can provide various types of network-based services that are configurable to execute tasks based on inputs from the customer computing device. In some scenarios, it may be possible for a customer or user to access the network-based services by utilizing the customer computing device. In certain scenarios, the network-based services can manage access to hosted network services by implementing authentication processes. In some embodiment, each individual network-based service can independently implement authentication processes that correspond to customer access to the specific network service. Such an approach does not require nor facilitate shared authentication processes among network-based services.

In some applications the customer's identity can be authorized by an authentication process utilizing a stand-alone network-based service, generally referred to as an identity provider service. The stand-along network-based service can be hosted or provided by a common network service provider or alternative, by an independent third-party service provider. Illustratively, an identity provider service may be able to authenticate individual customers as an independent process, and subsequently provided related authentication processing results to one or more network-based services. For example, in some embodiments, communications and associated interactions between an identity provider service and a network-based service can confirm to a protocol or template, such as Security Assertion Markup Language (SAML). In accordance with this approach, authentication by an identity provider service can be embodied as a SAML based authentication, which can be received and processed by a network-service that has been configured specifically by the user to receive SAML-based authentication. Absent a registration and configuration, a network-based service cannot utilize SAML-based authentications from an independent identity provider service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 4A and 4B are block diagrams of the system FIGS. 1A and 1B, respectively, illustrating various instructions for providing SAML configuration based on customer's pattern analysis;

DETAILED DESCRIPTION

Figure 1A:
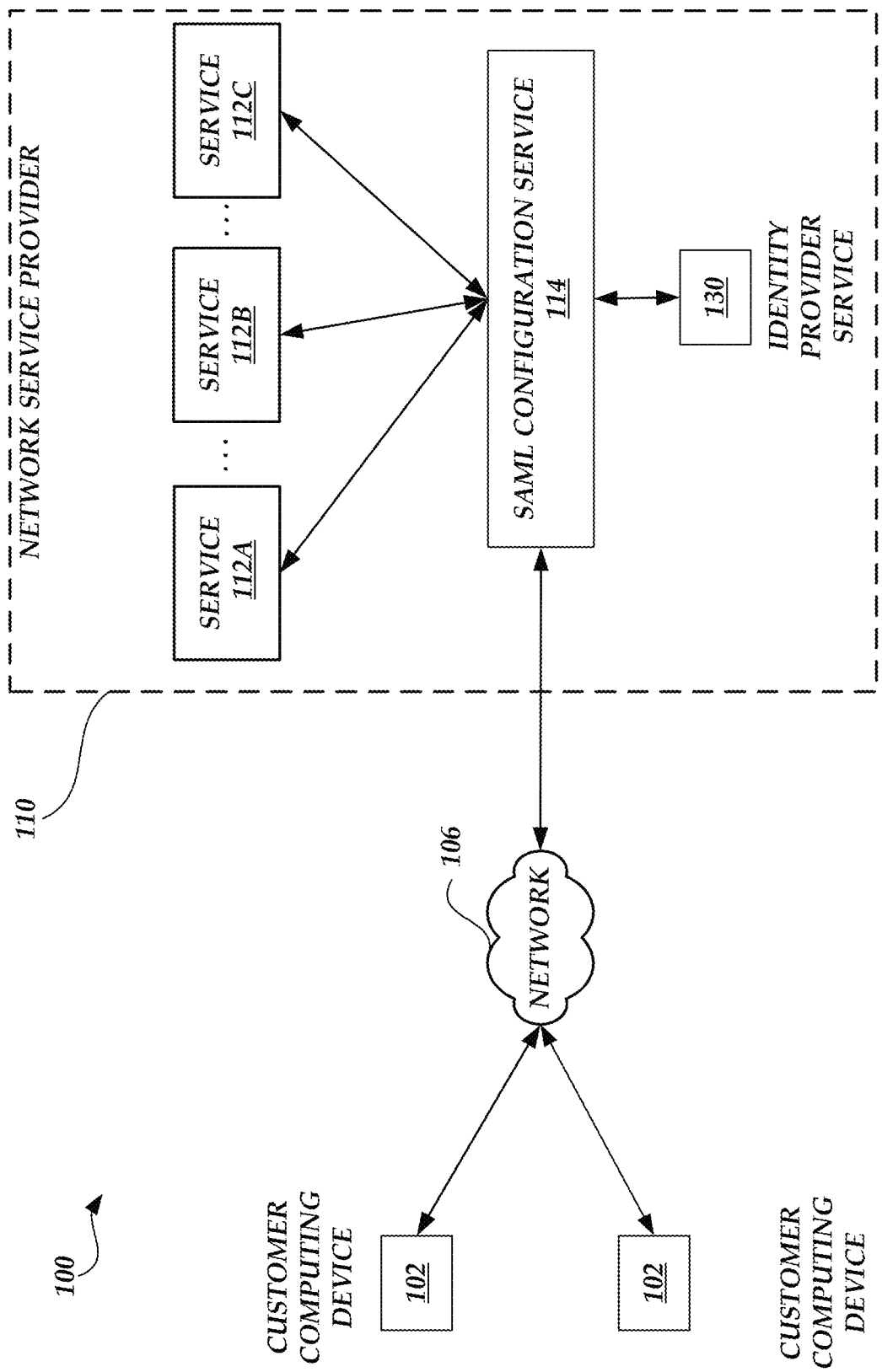
FIG. 1A is a block diagram of a SAML configuration system that includes one or more customer computing devices, a network service provider, a SAML configuration service, and an identity provider service according to one embodiment.

Aspects of the present disclosure relate to systems and methods for managing authentication information or authentication processing results from an identity provider service for a plurality of network-based services. Illustratively, one or more aspects of the present application correspond to utilization of network discovery processes to identify and configure a plurality of network-based services to interface with an identity provider service. The interaction between the plurality of network-based services and the identity provider service can illustratively correspond to Security Assertion Markup Language (SAML)-based communication.

In accordance with one or more aspects of the present application, an identity provider service or SAML configuration service can utilize individual customer patterns or activity to identify one or more network-based services not previously configured for SAML-based authentication communications. The customer pattern includes but is not limited to the customer's usage pattern of accessing or using network-based services or the customer's interest or selection of a network-based service. Based on the identification, the SAML configuration service can then facilitate the selection of additional network-based services for automated configuration to receive SAM-based authentication communications.

More specifically, in one embodiment, once a customer's identity is authenticated from at least one identity provider service, the SAML configuration service can identify additional network-based services that are not currently configured to receive SAML-based authentication communications and automate subsequent configure such that customer may have an authorization to access the network-based services without manually configuring a SAML configuration required by each network-based service.

In one aspect, the SAML configuration service may discover SAML-enabled services that the customer can access with the customer's authorization. Illustratively, the SAML configuration service may discover the SAML-enabled services and analyze the customer's usage pattern to provide a list of the SAML-enabled services the customer may use. In this illustration, the customer may select one or more SAML-enabled services from the list and provide the selection to the SAML configuration service.

In another aspect, the SAML configuration service may configure the SAML configurations associated with the SAML-enabled services. The SAML configuration can be performed automatically without requiring the customer to perform the configuration manually.

The SAML configuration service, as disclosed herein, can be implemented in network service provider resources or implemented as a stand-alone component.

As described above, communications and associated interactions between an identity provider service and a network-based service can confirm to a protocol or template, such as SAML, to allow a plurality of network-based services to leverage a single authentication process. However, in order for a network-based service to receive SAML-based authentication communications (e.g., a SAML-enable service), each individual network-based service may be configured by the customer/user.

Generally, traditional management of SAML-enabled services presents significant technical challenges for customers and network-based service providers. More specifically, the customer must manually identify SAML-enabled services that can access with the customer's SAML authentication information (i.e., access with the customer's authorization). In addition, the customer has to perform a manual SAML configuration associated with a SAML-enabled service. In one aspect, discovering the SAML-enabled services provided by the network service provider can be challenging because the network service provider may include a high number of network-based services. For example, a customer may access a primary network-based service in terms of access to a plurality of additional related or supporting network-based services. Each of these network-based services may implement authentication processes, but must be individually configured to receive SAML authentications. Often, a customer (through a computing device) may not have direct access or knowledge of the individual related or supporting services.

Furthermore, if there are multiple network service providers that each include multiple network-based services, discovering all of the SAML-enabled services from the plurality network service providers is challenging for the customer. In one aspect, after discovering the SAML-enabled services, the customer may have to manually configure the SAML configuration associated with the discovered service. To manually configure the SAML configuration, for example, the customer may have to access metadata of the identity provider service to download the customer's authentication information. In this example, the data format of the downloaded customer's authentication information has to be converted into a data format required by the SAML configuration associated with the service. In addition, the data format of the customer's authentication information and other parameters such as group ID, customer's ID, etc., also have to be configured into the SAML configuration of the service.

In one aspect, the network service provider can also have a challenge for optimizing its network resource usage. Illustratively, customers may utilize the network resources of the network service provider to access a SAML-enabled network-based service. For example, the customers may utilize network resources to discover or search the SAML-enabled services. Furthermore, if the customers did not successfully manually configure the SAML configuration, the network service provider cannot provide a proper service to the customer.

To address at least a portion of the above-described deficiencies, one or more aspects of the present disclosure correspond to systems and methods for providing SAML access to network-based services based on analyzing a customer's pattern. A SAML configuration service, according to one or more embodiments as disclosed herein, may discover a target set of SAML-enabled services provided by one or more network service providers that may be accessed by individual customers. The discovered set of SAML-enabled services may be limited to network-based services that are not currently configured to participate in SAML-based communication on behalf of an identified customer. For example, a target SAML-enabled service may correspond to a network-based service that has not been previously configured by a customer. In another example, a target SAML-enabled service may correspond to a network-based service in which a SAML configuration has expired, canceled, revoked, etc.

Illustratively, the SAML configuration service may access the network instances of the network service providers by utilizing a customer's authentication information to discover the target set of SAML-enabled services that are accessible to the customer. In some embodiments, the SAML configuration service prioritizes the discovered set of target SAML-enabled services to provide a list of the discovered SAML-enabled services based on additional processing. In these embodiments, the additional processing can include prioritization or filtering based on analyzing a customer's pattern, such as a network-based service usage pattern associated with the customer. In other embodiments, the additional processing can include identification of network-based services based on known or observed dependency information associated with the execution of network-based services. For example, the SAML configuration service can utilize established dependency information or observed access information to identify network-based services characterized as likely to be accessed with other network-based services. Illustratively, the historical information can be limited to historical information associated with the customer. Alternatively, the historical information can include access information related to additional customers based on organizational criteria.

In other embodiments, the SAML configuration service may not be limited to discovery processes associated with a single service provider and may analyze a customer's usage pattern associated with multiple network service providers. For example, the SAML configuration service may implement multiple iterations of discovery processes to discover the target set of SAML-enabled services associated with a plurality of network service providers (e.g., a set of cloud service providers associated with individual customer). In this embodiment, the SAML configuration service may analyze the customer's usage of the individual network service providers and prioritize (e.g., supplement or filter) the set of target SAML-enabled services hosted by the network service providers based on the individual usage information at each respective network service provider. Then, the SAML configuration service may provide the processed list of target SAML-enabled services based on the usage of the network providers, such that the SAML-enabled services included in the network service provider with the highest customer usage can be provided first.

In some embodiments, it may be possible for the SAML configuration service to configure a SAML configuration of the SAML-enabled services. The SAML configuration service can automatically configure the SAML configuration associated with a SAML-enabled service. Illustratively, the SAML configuration service may identify one or more parameters required for the configuration. In this illustration, the SAML configuration service may parse the parameters by applying a parsing rule, and the parsed parameters can be used for the configuration. In some embodiments, after parsing the parameters, the parsed parameters can be mapped into the SAML configuration data set. Illustratively, the configuration of SAML-enabled services may be defined in accordance with standardized or established SAML communications such that the information required for configuration is pre-defined. Accordingly, automatic configuration of SAML-enabled service can include collection of a set of information associated with customers, formatting or processing the collected information and transmission of the formatted or processed information to one or more components. The SAML configuration service can further verify and validate the configuration information to be considered proper for SAML configuration and consistent with other SAML configurations.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Still further, embodiments of the present application will be described with regard to authentication protocols and standards, such as SAML. Such illustrations and exemplary standards are not intended to be limited and should not be construed as limiting the scope of the present application. Additionally, the examples are intended to be illustrative in nature and should not be construed as limiting.

FIG. 1A depicts a block diagram of an embodiment of the system 100. The system 100 can include a network 106, the network connecting a number of customer computing devices 102 and a network-based services 110. Illustratively, the various aspects associated with the network service provider 110 can be implemented as one or more components that are associated with one or more functions or services. The components may correspond to software modules implemented or executed by one or more customer computing devices, which may be separate stand-alone customer computing devices. Accordingly, the components of the network service provider 110 should be considered as a logical representation of the service, not requiring any specific implementation on one or more customer computing devices.

Network 106, as depicted in FIG. 1A, connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services. In some embodiments, the network may be a content delivery network.

The customer computing device 102 in FIG. 1A can connect to the network and the network service provider 110. The customer computing device 102 may be representative of a computing network associated with a plurality of customer computing devices. Solely for illustration purposes, customer computing device 102 represents a customer's action to access to SAML-enabled services. Generally, the customer computing device 102 attempts to access the services 112 by authenticating the customer's credential information to access the network-based services 110.

The customer computing device 102 can be configured to transmit a request to the network service provider 110 to illustratively access one or more network-based services using a communication protocol. The customer computing device 102 can be configured to have at least one processor. That processor can be in communication with the memory for maintaining computer-executable instructions. The customer computing device 102 may be physical or virtual. The customer computing devices 102 may be mobile devices, personal computers, servers, or other types of devices. The customer computing device 102 may have a display and input devices through which a user can interact with the user-interface component.

Illustratively, the network service provider 110 can include a plurality of network-based services (or SAML-enabled services) that can provide functionality responsive to configurations/requests transmitted by the customer computing devices 102, such as in the implementation of a set of microservices that are configured to provide underlying functionality to applications hosted by a service provider. As illustrated in FIG. 1A, the network service provider 110 can include a set of network-based services 112A, 112B, 112C, etc. (generally referred to as network-based services, network services, or services). Illustratively, each service can be configured with defined functionality that can be accessed based on communication or executable commands. One or more services 112 can be accessed directly with communications transited by the customer computing device 102 via various interfaces. Additionally, one or more services 112 may also be considered dependent services or complimentary services that are accessed based on communications or commands from other services. Such dependent or complimentary services 112 may or may not be directly accessible to communications from the customer computing device 102 (even if the execution of the dependent or complimentary services is being performed on behalf of the customer). Without limitation services 112 can include virtualization services, streaming services, query processing services, data processing services, data storage or warehousing services, analytics services, database services, monitoring services, security services, content delivery services, and the like.

For purposes of the present application, as described herein, each of the services 112A, 112B, 112C can implement some form of customer authentication process as part of the execution of functionality. Illustratively, the services 112 can be configured, such as with necessary executable code or modules, to allow for SAML-based communications to facilitate the authentication process with one or more identity service providers. Accordingly, reference to a SAML-enable service corresponds generally to one or more services that are available for SAML-based authentication communications and that can be further configured to receive SAML-based authentication communications from one or more identity provider services to authenticate identifier customers. The manner and extent of the preparation of the network service for SAML-based authentication can vary or may be uniform, depending on the requirements of the authentication protocol, customer preferences, service provider preferences, the like. Additionally, in some embodiments, the services 112A, 112B, 112C represent different logical or geographic regions provided by the network service provider 110.

The network service provider 110 further includes a SAML configuration service 114 that represents the various functions to discover the SAML-enabled services and configure a SAML configuration with one or more services 112A, 112B, 112C. In some embodiments, the SAML configuration service 114 may receive a customer's authentication information. In these embodiments, the SAML configuration service 114 may receive the authentication information from an identity provider service 130. Illustratively, the identity provider service 130 can correspond to one or more computing devices that are configured in accordance with the authentication protocol to provide SAML-based authentication communications to one or more services. Illustratively, the identity provider service 130 interacts initially with customer computing devices 102 to authenticate the customer using an authentication process. Once authenticated, the identity provider service 130 can exchange SAML-based authentication communications to provide authentication information or processing results of the authentication process to one or more SAML-enabled services that have been further configured to utilize SAML as an authentication methodology. A SAML-enabled service that has not been further configured would typically not otherwise be able to exchange or process with the identity provider service 130. This would result in the failure of a customer to access such non-configured SAML-enabled service or have to implement some additional, independent authentication methodology/process. Illustratively, the identity provider service 130 can correspond to a stand-alone service that can be independent of any additional service in the network service provider 110. In other embodiments, the identity provider service 130 can be independent of the network service provider 110. Still further, the number of identity provider service is not limited in this disclosure, and any number of identity provider services can be accessed via the network 106.

In some embodiments, the SAML configuration service 114 may access the services 112A, 112B, 112C to discover a set of target SAML-enabled services that have not been previously configured to received SAML-based communications on behalf of an identified customer. As described above, the individual target SAML-enabled services can provide functionality/access to customers or services initiated by customers based on the customer's authentication information. After discovering the SAML-enabled services, the SAML configuration service 114 may transmit the list of the targeted SAML-enabled services 112A, 112B, 112C to the customer computing device. For example, the SAML configuration service 114 can provide graphical user interfaces that may allow for the selection of display objects that facilitate the selection of one or more of the identified target SAML-enabled services for SAML configuration.

In some embodiments, the SAML configuration service 114, in response to receiving a customer's selection of one or more services from the list of the services, may identify parameters required for the SAML configuration with the selected services. For example, if the customer selected the service 112A, the SAML configuration service 114 may identify the required parameters to access the service 112A and obtain the parameters from one or more sources such as identity provider service 130, metadata URL, customer's input, etc. In this example, the SAML configuration service 114 may parse the obtained parameters to be used for configuring the SAML configuration. Additionally, if required, the SAML configuration service 114 can facilitate the creation of accounts, profiles, preferences, etc. to access the service 112A.

Figure 1B:
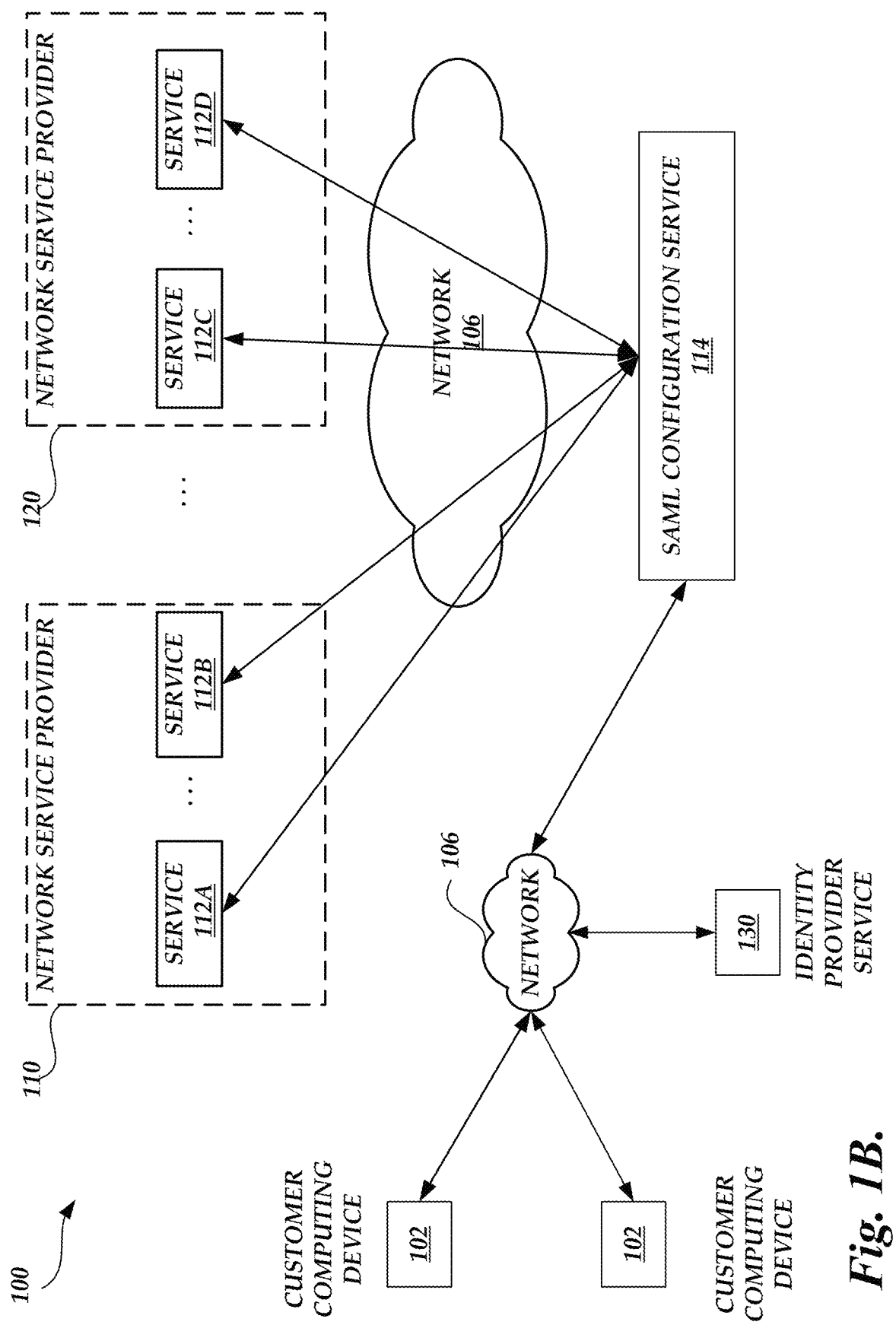
FIG. 1B is a block diagram of a SAML configuration system that includes one or more customer computing devices, more than one network service provider, a SAML configuration service, and an identity provider service according to one embodiment.

FIG. 1B depicts a block diagram of an example embodiment of the system 100.

As similar to the embodiment depicted in FIG. 1A, the system shown in FIG. 1B can include a network 106, the network connecting a number of customer computing devices 102 and a network-based service 110.

In some embodiments, the identity provider service 130 can be implemented into the system 100 as a stand-alone service. In these embodiments, the customer computing device 102 can be authenticated by transmitting the customer's credential information to the identity provider service 130. In one embodiment, a plurality of identity provider services can be connected to the network 106, and the customer can select an identity provider service to authenticate the customer's credential. In some embodiments, after authenticating the customer, the identity provider service may transmit the customer's authentication information to the SAML configuration service 114. The identity provider service, for example, includes any commercially available service that can perform an authentication of a customer to access SAML-enabled services.

The system as depicted in FIG. 1B can include multiple network service providers 110, 120. Each network service provider may provide SAML-enabled services to the customers. More specifically, the network service providers 110, 120 provide the different services 112A, 112B and 112C, 112D. This disclosure does not limit the number of services, and any number of services can be implemented into the network-based services. Illustratively, the various aspects associated with the network service provider 110 can be implemented as one or more components that are associated with one or more functions or services. The components may correspond to software modules implemented or executed by one or more customer computing devices, which may be separate stand-alone customer computing devices. Accordingly, the components of the network service provider 110 should be considered as a logical representation of the service, not requiring any specific implementation on one or more customer computing devices. In addition, the present disclosure is not limited to any number of components as disclosed herein.

FIG. 1B further depicts the SAML configuration service 114 as a stand-alone component. In some embodiments, the SAML configuration service 114 may access one or more network service providers 110, 120. In these embodiments, the SAML configuration service 114 may discover or identify a set of target SAML-enabled services 112 associated with each network service provider 110, 120. In addition, the SAML configuration service 114 may transmit a list of SAML-enabled services based on an analysis of customer's usage pattern of each network service provider. For example, the SAML configuration service 114 may determine that the customer has a pattern of using the network service provider 110 more than any other network service provider. In this example, the SAML configuration service 114 may list the SAML-enabled services associated with the network service provider 110 as having a higher priority. Thus, the SAML configuration service 114 may transmit the list of the SAML-enabled services associated with the network service provider 110 before transmitting any other SAML-enabled services associated with other network service providers. In some embodiments, the customer may select one or more network service providers, and the SAML configuration service 114 may configure SAML configurations associated with the SAML-enabled services included in the selected network service provers.

In some embodiments, the SAML configuration service 114 may configure, or cause to be configured, a SAML configuration associated with a customer's selected service. For example, if the customer selects service 112A in the network service provider 110, the SAML configuration service 114 may configure the SAML configuration associated with the service 112A . . . . In these embodiments, the SAML configuration service 114 may transmit one or more parameters related to the configuration to the identity provider service 130. Such parameters can include, but are not limited to, application name information, group name information, configuration information, customer selection criteria, and various combinations or substitutions thereof.

Figure 2:
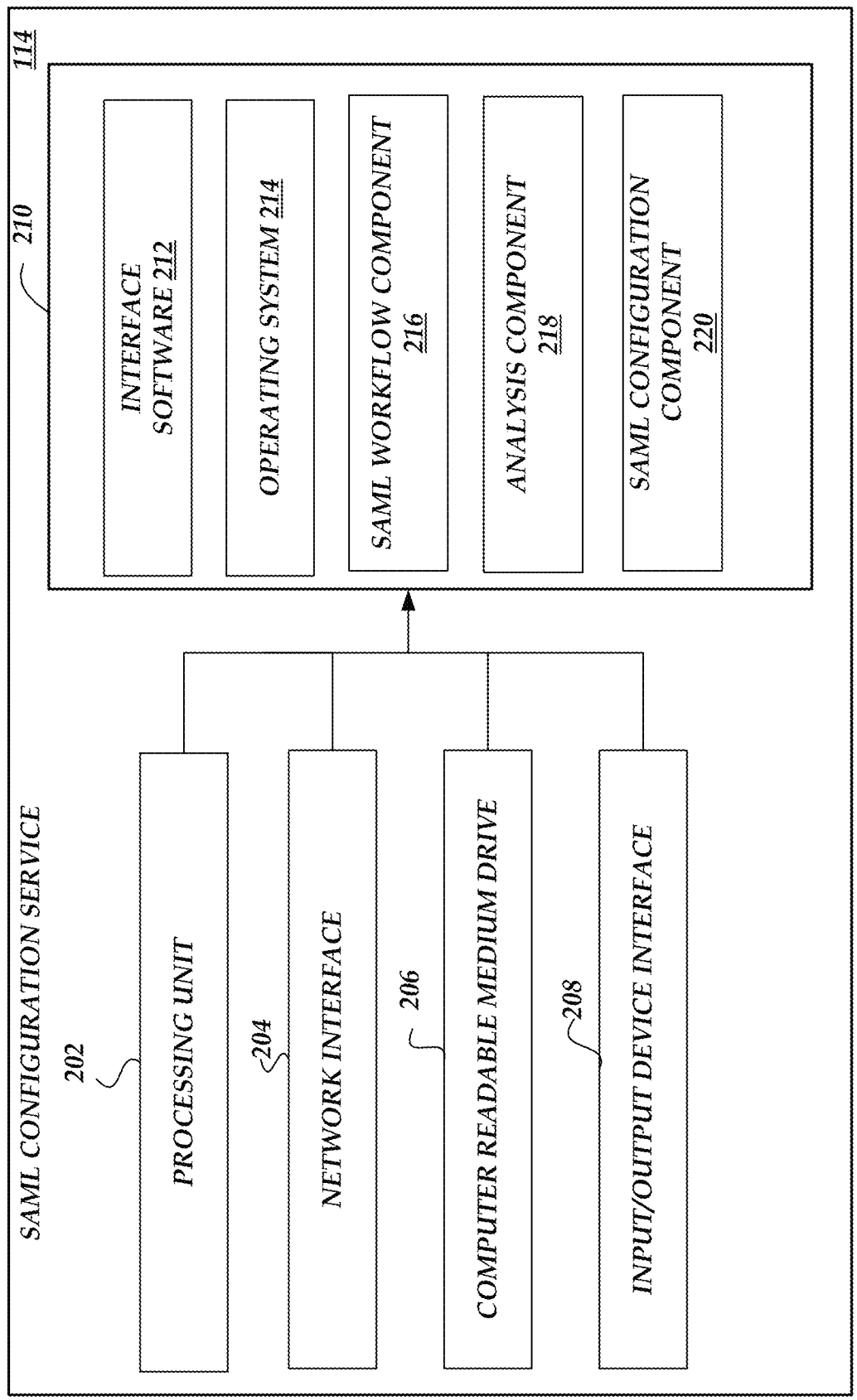
FIG. 2 is a block diagram of illustrative components of a SAML configuration service to discover SAML-enabled services and configure SAML configuration based on customer pattern based analysis.

FIG. 2 depicts one embodiment of an architecture of an illustrative SAML configuration service 114. The SAML configuration service 114 can be configured to discover SAML-enabled services, access to network service providers, configure SAML configuration, etc. In some embodiments, the SAML configuration service 114 identifies the customer's authentication information by receiving the authentication information from an identity provider service 130 (shown in FIG. 1A) or the customer computing device 102 (shown in FIG. 1A). The SAML configuration service 114 may discover the SAML-enabled services based on the customer's authentication information and provide the discovered services to the customer. In some embodiments, the SAML configuration service 114 receives a customer's selection of service and configures the SAML configuration associated with the customer's selected service. The general architecture of the SAML configuration service 114 depicted in FIG. 2 includes an arrangement of computer hardware and software components that may be used to implement aspects of the present disclosure. As illustrated, the SAML configuration service 114 includes a processing unit 202, a network interface 204, a computer-readable medium drive 206, and an input/output device interface 208, all of which may communicate with one another by way of a communication bus. The components of the SAML configuration service 114 may be physical hardware components or implemented in a virtualized environment.

The network interface 204 may provide connectivity to one or more networks or computing systems, such as the network 106 of FIGS. 1A and 1B. The processing unit 202 may thus receive information and instructions from other computing systems or services via a network. The processing unit 202 may also communicate to and from memory 210 and further provide output information for an optional display via the input/output device interface 208. In some embodiments, the SAML configuration service 114 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the SAML configuration service 114. The memory 210 may further include computer program instructions and other information for implementing aspects of the present disclosure. For example, in one embodiment, the memory 210 includes interface software 212 for communicating with other components or services and performing SAML-enabled services' discovery or SAML configuration processes.

Additionally, the memory 210 includes a SAML workflow component 216 for processing customers' authentication information to discover SAML-enabled services. The SAML workflow component 216 may identify the customer's authentication information received from the identity provider service 130. The SAML workflow component 216 may also identify the customer's authentication information to be received directly from the customer computing device. In some embodiments, the SAML workflow component 216 discovers SAML-enabled services. In these embodiments, the SAML workflow component 216 accesses each of the services provided by the network service provider and determines whether the service is SAML-enabled. In other embodiments, as depicted in FIG. 1B, the SAML workflow component 216 may access to the one or more network service providers to determine SAML-enabled services included in the network service providers.

The memory 210 may include an analysis component 218 to analyze the customer pattern and prioritize the list of discovered services. In some embodiments, the analysis component 218 identifies the customer's pattern in using the SAML-enabled services. The customer's pattern may include, for example, the customer's usage of services, the customer's interest, etc. The service usage can be determined based on the number of times the customer accessed during the time or duration that the customer used the service. For example, the analysis component 218 may determine the customer's usage for each service provided by the network service provider. In this example, the analysis component 218 may prioritize the discovered target SAML-enabled services based on the customer's usage. In one embodiment, the analysis component 218 may determine the customer's usage of the services for some of the services provided by the network service provider. The number of services used for analyzing the customer's usage can be determined based on a specific application or computing resource. In some embodiments, the discovered SAML-enabled services can be transmitted to the customer computing device based on the prioritization.

In some embodiments associated with FIG. 1B, the analysis component 218 may analyze the customer's usage pattern of the network service providers. For example, the analysis component 218 determines the customer's usage for each network service provider. In these embodiments, the analysis component 218 may prioritize the network service providers based on the customer's usage. In addition, based on the prioritization, the analysis component 218 may prioritize the discovered SAML-enabled services associated with the network service providers. For example, the analysis component 218 can determine a prioritized list of the network service providers based on the customer's usage, where each network service provider may include the discovered SAML-enabled services. Thus, the analysis component 218 may transmit the SAML-enabled services included in the highest prioritized network service provider and then transmit the SAML-enabled services included in the second-highest prioritized network service provider, and so on.

The memory 210 may further include a SAML configuration component 220 to configure the SAML configuration associated with the customer's selected services. The customer may select one or more services from the list of discovered SAML-enabled services determined by the SAML workflow component 216 and/or the analysis component 218. Each of the SAML-enabled services may require a specific SAML configuration to provide permission to the customer to access to the services. In some embodiments, the SAML configuration component 220 identify one or more parameters required to configure the SAML configuration of the selected services. The parameters can include authentication information, an entity ID, an authentication format or link, an identity provider service information, service provider metadata URL, etc. These parameters can be identified from the customer's authentication information received from the identity provider service 130. In some embodiments, the SAML configuration can be performed by mapping the identified parameters into the data format or specification of the SAML configuration of the selected services. In these embodiments, the SAML configuration component 220 may apply a parsing rule to map the identified parameters into the SAML configuration of the selected services. In some embodiments, the customer may select a network service provider, and the SAML configuration component 220 configures the SAML configuration for the SAML-enabled services associated with the customer's selected network service provider. In addition, the identified parameters can be transmitted to the identity provider service 130, where the identity provider service also configures its parameters based on the SAML configuration of the selected services. In some embodiments, the customer may select one or more network service providers, and the SAML configuration service 114 may configure SAML configurations associated with the SAML-enabled services included in the selected network service provers.

The memory 210 shown in FIG. 2 is merely illustrated as an example, and the present disclosure is not limited thereto, and one or more system components, computing devices or processors can be used to execute computer program instructions that the processing unit 204 executes in order to implement one or more embodiments disclosed in the present disclosure. Accordingly, reference to memory is intended in a general sense and should not be construed as limiting to any particular embodiment or configuration.

Figure 3:
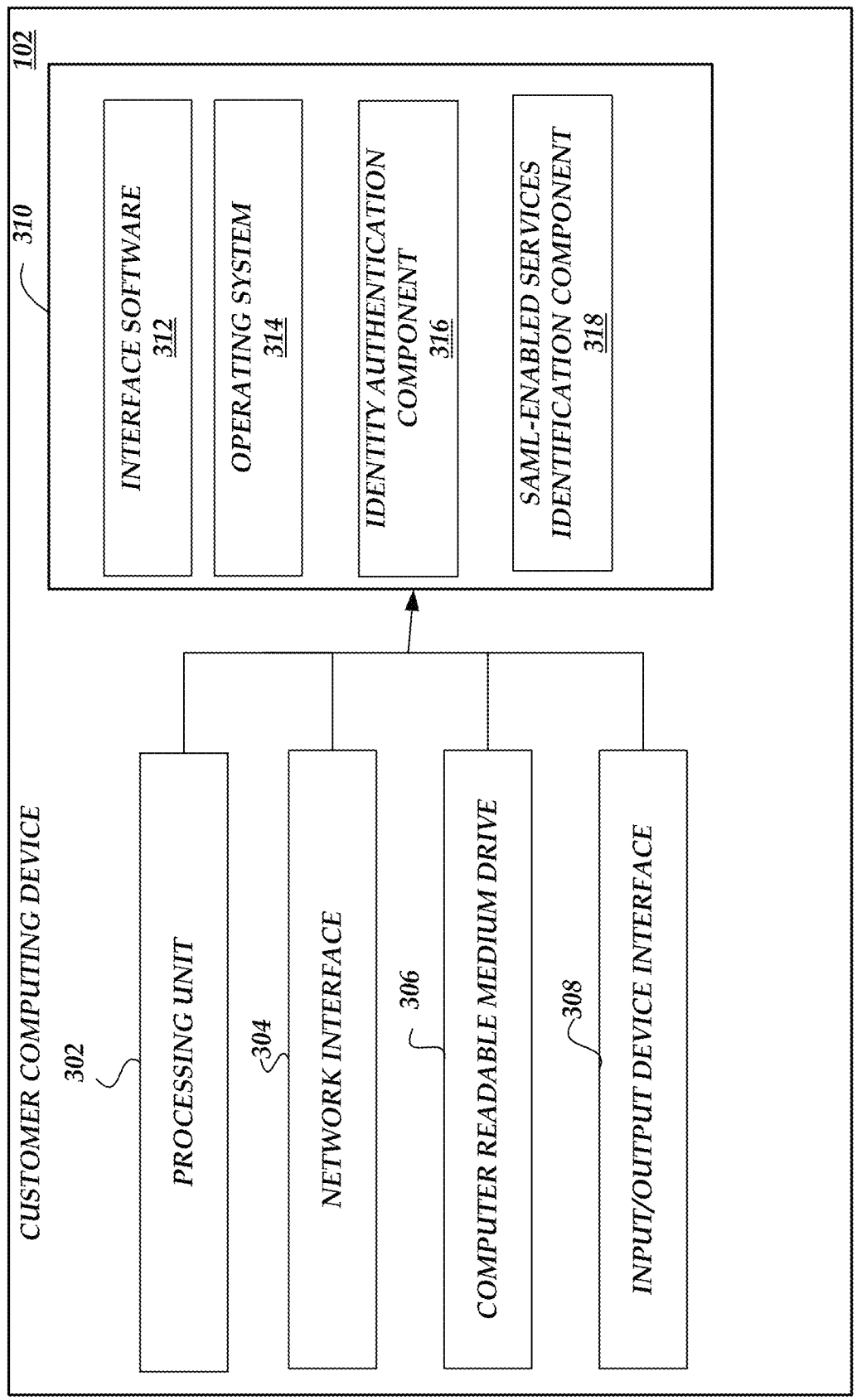
FIG. 3 is a block diagram of illustrative components of customer computing device for performing a customer authentication and SAML-enabled service selection.

FIG. 3 depicts one embodiment of an architecture of an illustrative customer computing device 102 for performing a customer authentication and SAML-enabled service selection. The general architecture of the customer computing device is depicted in FIG. 3 includes an arrangement of computer hardware and software components that may be used to implement aspects of the present disclosure. As illustrated, the customer computing device 102 includes a processing unit 302, a network interface 304, a computer readable medium drive 306, and input/output device interface 308, all of which may communicate with one another by way of a communication bus.

The network interface 304 may provide connectivity to one or more networks or computing systems, such as the network 106 of FIGS. 1A and 1B. The processing unit 302 may thus receive information and instructions from other computing systems or services via a network. The processing unit 302 may also communicate to and from memory 310 and further provide output information for an optional display via the input/output device interface 308. In some embodiments, the customer computing device 102 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the customer computing device 102. The memory 310 may further include computer program instructions and other information for implementing aspects of the present disclosure. For example, in one embodiment, the memory 310 includes interface software 312 for receiving a list of discovered SAML-enabled services and processing by selecting one or more services from the customer.

Additionally, the memory 310 includes an identity authentication component 316 for authenticating the customer's credential in accessing the SAML-enabled services. In some embodiments, the identity authentication component 316 provides a list of available identity provider services 130 to the customer. In these embodiments, the customer may select one of the identity provider services 130 and input the customer's credential information. The identity authentication component 316 may authenticate the customer's credential information and store the authentication information. The authentication information can be used in configuring a SAML configuration of one or more services. In some embodiments, the identity authentication component 316 may transmit the customer's credential information to the network service provider 110, including the SAML configuration service 114 and identity provider service 130 as depicted in FIG. 1A. In these embodiments, the customer can be authenticated without utilizing an external identity provider service.

The memory 310 may further include a SAML-enabled services identification component 318 to select one or more of the services. As described in FIG. 2, the SAML workflow component 216 may discover the SAML-enabled services and transmit the list of SAML-enabled services to the customer computing device. The list of the SAML-enabled services may further be processed by the analysis component 218 to prioritize each of the services. In some embodiments, the SAML-enabled services identification component 318 may display the list of services, and the customer may select one or more services from the list of the services. The selected services can be transmitted to the SAML configuration service 114, where the SAML configuration component 220 can configure the SAML configuration associated with the selected services.

The memory 310 shown in FIG. 3 is merely illustrated as an example, and the present disclosure is not limited thereto, and one or more system components, computing devices or processors can be used to execute computer program instructions that the processing unit 204 executes in order to implement one or more embodiments disclosed in the present disclosure.

Figure 4A:
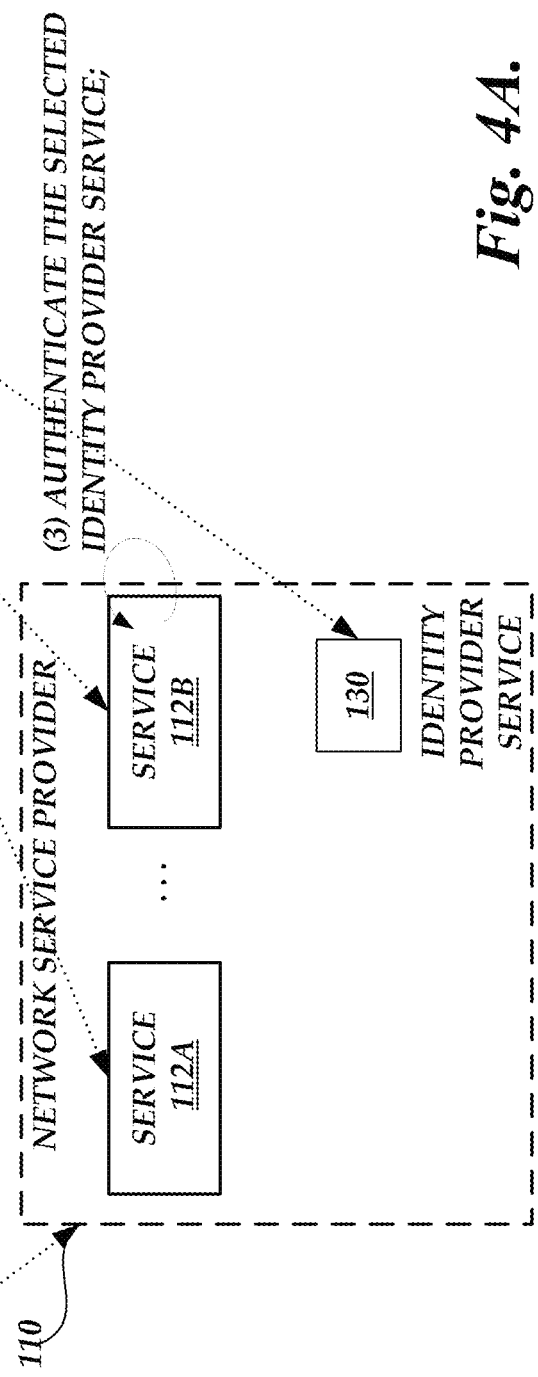

Turning now to FIGS. 4A-4B, illustrative interactions of the components of the system 100 as shown in FIGS. 1A and 1B will be described. For purposes of the illustration, it can be assumed that a network provider 110 has been configured in a manner to implement a plurality of network services 112 on behalf of a customer. The present application is not intended to be limited to any particular type of service or the number of individual services that may be accessed or generate processing results as part of an execution of an application on behalf of customers. Furthermore, the present application is not intended to be limited to the number of network service providers as depicted in FIG. 1B, and the number of identity provider services 130.

With reference to FIG. 4A, an illustrative interaction of SAML configuration based on analyzing a customer's pattern, will be described. The interaction is illustrative. At (1), a customer may log in to the network service provider. In some embodiments, the network service provider provides a service platform such as a cloud.

At (2), the customer may select an identity provider service. In some embodiments, the identity provider services are configured as a stand-alone component or service. In these embodiments, the customer computing device 102 may display a list of available identity provider services, and the customer may select one identity provider service from the list of available identity provider services.

At (3), the customer can be authenticated. To access the SAML-enabled services, the customer is needed to be authorized by authenticating the customer's credentials. In some embodiments, the identity provider service 130 is implemented into the network service prover 110 as a service component. In these embodiments, the identity provider service implemented in the network service provider may authenticate the customer using the login information provided by the customer at (1). In some embodiments, the identity provider services are provided as an external component or service as described at (2). In these embodiments, the customer is required to input the customer's credentials' information to the selected identity provider service at (2). The selected identity provider service may authenticate the customer's credentials and transmit the authentication information to the SAML configuration service 114.

At (4), the SAML configuration service 114 may discover a set of target SAML-enabled services based on the customer's authentication information (or a portion of the customer information). The SAML configuration service 114 can be implemented into the network service provider 110 or as a stand-alone component or service. In some embodiments, where the SAML configuration service 114 is implemented into the network service provider 110, the SAML configuration service 114 may access to the network service provider 110 to discover the SAML-enabled service included in the network service provider 110.

At (5) the SAML configuration service 114 may analyze the discovered SAML-enabled services to prioritize the services. In some embodiments, the SAML configuration service 114 identifies the customer's pattern in using the services. The customer's pattern may include, for example, the customer's usage of services, the customer's interest, etc. The usage of service can be determined based on the number of times the customer accessed during a time period or duration that the customer used the service. For example, the SAML configuration service 114 may determine the customer's usage for each service provided by the network service provider. In this example, the SAML configuration service 114 may prioritize the discovered SAML-enabled services based on the customer's usage. In one embodiment, the SAML configuration service 114 may determine the customer's usage of the services for some of the services provided by the network service provider. The number of services used for analyzing the customer's usage can be determined based on a specific application or computing resource. In some embodiments, the discovered SAML-enabled services can be transmitted to the customer computing device based on the prioritization.

At (6), the SAML configuration service 114 may transmit the list of the discovered SAML-enabled services to the customer computing device 102. The sequence of transmitting the list of the discovered SAML-enabled services is based on the prioritization determined by analyzing the customer's usage pattern. This sequence in transmitting the list of services is advantageous because if there are a high number of discovered SAML-enabled services, the sequence can help the customer in selecting the services.

At (7), the SAML configuration service 114 may configure the SAML configuration associated with the customer's selected services. Each of the SAML-enabled services may require a specific SAML configuration to provide permission to the customer to access to the services. In some embodiments, the SAML configuration service 114 identifies one or more parameters required to configure the SAML configuration of the selected services. The parameters can include authentication information, an entity ID, an authentication format or link, an identity provider service information, service provider metadata URL, etc. These parameters can be identified from the customer's authentication information received from the identity provider service 130. In some embodiments, the SAML configuration service 114 can be performed by mapping the identified parameters into the data format or specification of the SAML configuration of the selected services. In these embodiments, the SAML configuration service 114 may apply a parsing rule to map the identified parameters into the SAML configuration of the selected services. In addition, the identified parameters can be transmitted to the identity provider service 130, where the identity provider service also configures its parameters based on the SAML configuration of the selected services.

With reference to FIG. 4B, an illustrative interaction of SAML configuration based on one embodiment, will be described. The interaction is illustrative. At (1), the customer may select an identity provider service. In some embodiments, the identity provider services are configured as stand-alone components. In these embodiments, the customer computing device 102 may display a list of available identity provider services, and the customer may select one identity provider service from the list of available identity provider services.

At (2), the customer can be authenticated. To access the SAML-enabled services, the customer may need to be authorized by authenticating the customer's credentials. In some embodiments, the customer is required to input the customer's credentials' information to the selected identity provider service at (1). The selected identity provider service may authenticate the customer's credentials and transmit the authentication information to the SAML configuration service 114.

At (3), the SAML configuration service 114 may discover the SAML-enabled services based on the customer's authentication information. In some embodiments, the SAML configuration service 114 access to two or more network service providers. Each of the network service providers may include SAML-enabled services. In some embodiments, the SAML configuration service 114 may discover the SAML-enabled services for each network service provider.

At (4), the SAML configuration service 114 may analyze the customer's usage pattern of the network service providers. In some embodiments, the SAML configuration service 114 determines the customer's usage for each network service provider. In these embodiments, the SAML configuration service 114 may prioritize the network service providers based on the customer's usage. In addition, based on the prioritization, the SAML configuration service 114 may prioritize the discovered SAML-enabled services associated with the network service providers. For example, the SAML configuration service 114 can determine the prioritized list of the network service providers based on the customer's usage. Thus, the SAML configuration service 114 may transmit the SAML-enabled services included in the highest prioritized network service provider and then transmit the SAML-enabled services included in the second-highest prioritized network service provider, and so on.

At (5), the SAML configuration service 114 may configure the SAML configuration associated with the customer's selected services. Each of the SAML-enabled services may require a specific SAML configuration to provide permission to the customer to access to the services. In some embodiments, the SAML configuration service 114 identifies one or more parameters required to configure the SAML configuration of the selected services. The parameters can include authentication information, an entity ID, an authentication format or link, an identity provider service information, service provider metadata URL, etc. These parameters can be identified from the customer's authentication information received from the identity provider service 130. In some embodiments, the SAML configuration service 114 can be performed by mapping the identified parameters into the data format or specification of the SAML configuration of the selected services. In these embodiments, the SAML configuration service 114 may apply a parsing rule to map the identified parameters into the SAML configuration of the selected services. In addition, the identified parameters can be transmitted to the identity provider service 130, where the identity provider service also configures its parameters based on the SAML configuration of the selected services.

Further at (5), in some embodiments, the customer selects a network service provider. In these embodiments, the SAML configuration service 114 configures the SAML configurations associated with the discovered SAML-enabled services included in the selected network service provider. In some embodiments, the customer may select one or more network service providers, and the SAML configuration service 114 may configure SAML configurations associated with the SAML-enabled services included in the selected network service provers.

Figure 5:
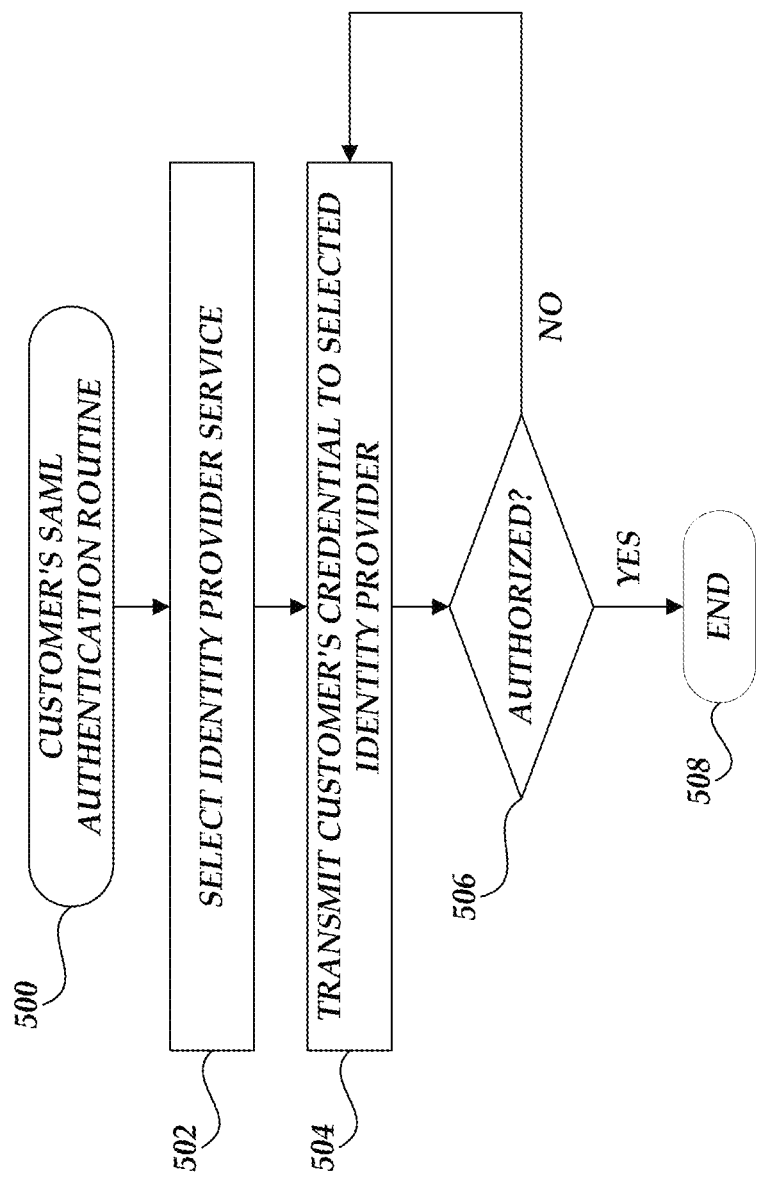
FIG. 5 is a flow diagram illustrative of a routine for customer's SAML authentication.

Turning now to FIG. 5, a routine 500 for customer's SAML authentication utilizing an identity provider service will be described. Routine 500 is illustratively implemented by the customer computing device 102.

At block 502, the customer may select an identity provider service. In some embodiments, the identity provider services are configured as a stand-alone component or service. In these embodiments, the customer computing device 102 may display a list of available identity provider services, and the customer may select one identity provider service from the list of available identity provider services. In other embodiments, the identity provider service 130 is implemented into the network service prover 110 as a service component. In these embodiments, the identity provider service implemented in the network service provider may authenticate the customer using the login information in accessing to the network instance of the network service provider.

At block 504, the customer computing device may transmit the customer's credential information to the selected identity provider. In some embodiments, the identity provider, by receiving the customer's credential information, may authenticate the customer to determine whether the customer can access to the services. In these embodiments, the authentication is based on the SAML authentication, and the authenticated customer can access to any SAML-enabled services.

At block 506, if the customer is authenticated, the routine 500 is ended at 508. If the customer is not authenticated, the customer may have to re-transmit the credential information to be authenticated.

Figure 6:
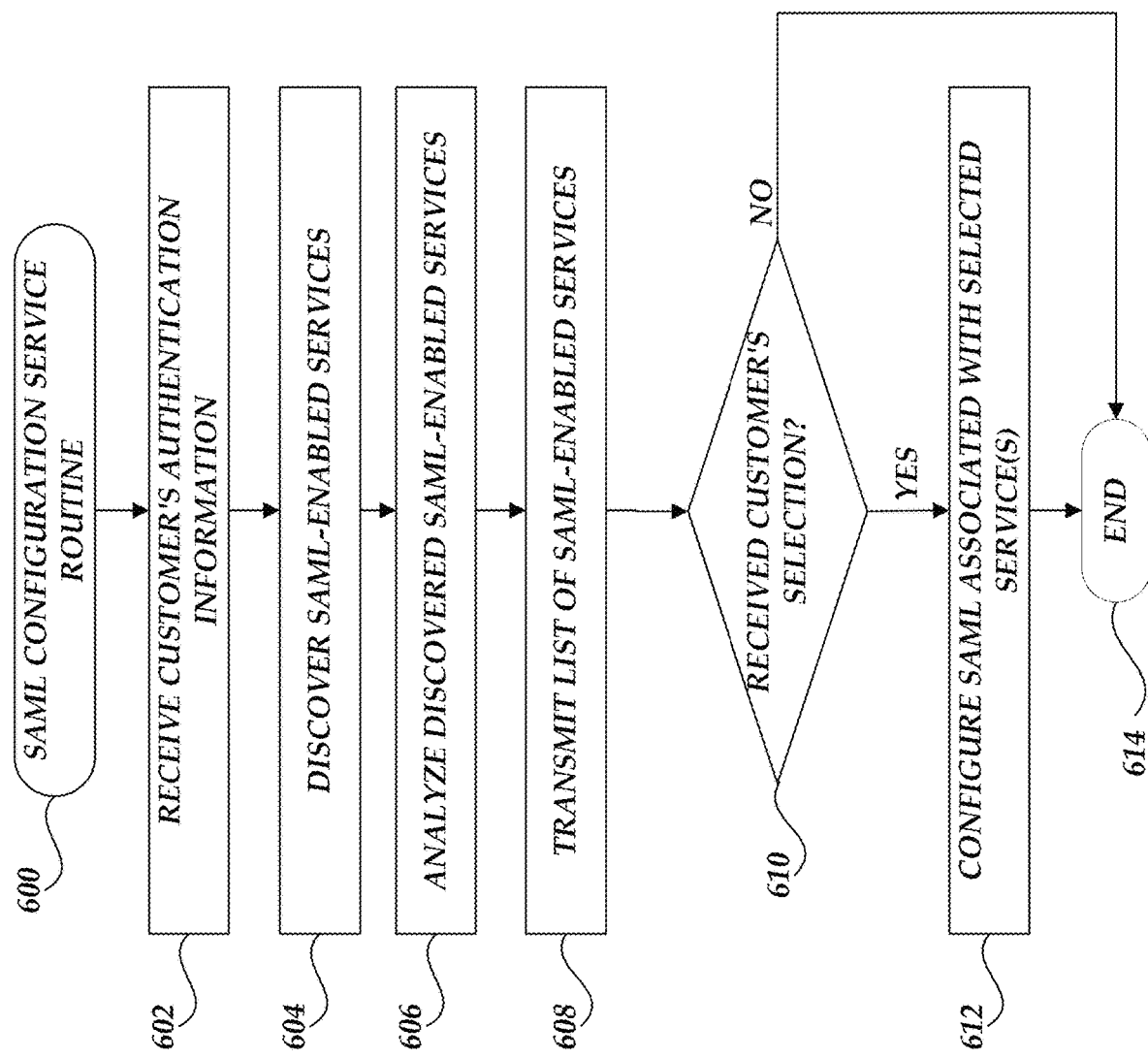
FIG. 6 is a flow diagram illustrative of a routine for SAML configuration service.

Turning now to FIG. 6, a routine 600 for providing a SAML configuration utilizing a SAML configuration service 114 will be described. Routine 600 is illustratively implemented by the SAML configuration service 114.

At block 602, the SAML configuration service 114 may receive customer's authentication information. The authentication information may include a SAML authentication information. To access the SAML-enabled services, the customer may need to be authorized by authenticating the customer's credentials. In some embodiments, the customer is required to input the customer's credentials' information to an identity provider service. The identity provider service may authenticate the customer's credentials and transmit the authentication information to the SAML configuration service 114.

At block 604, the SAML configuration service 114 may discover SAML-enabled services based on the customer's authentication information. The SAML configuration service 114 can be implemented into the network service provider 110 or as a stand-alone component or service. In some embodiments, where the SAML configuration service 114 is implemented into the network service provider 110, the SAML configuration service 114 may access to the network service provider 110 to discover the SAML-enabled service included in the network service provider 110. In some embodiments, where the SAML configuration service 114 access to two or more network service providers. Each of the network service providers may include SAML-enabled services. In some embodiments, where the SAML configuration service 114 is implemented as a stand-alone service, the SAML configuration service 114 may discover the SAML-enabled services for each network service provider.

At block 606, the SAML configuration service 114 may analyze a customer's pattern on the discovered SAML-enabled services. In some embodiments, the SAML configuration service 114 identifies the customer's pattern in using the services. The customer's pattern may include, for example, the customer's usage of services, the customer's interest, etc. The usage of service can be determined based on the number of times the customer accessed during a time period or duration that the customer used the service. For example, the SAML configuration service 114 may determine the customer's usage for each service provided by the network service provider. In this example, the SAML configuration service 114 may prioritize the discovered SAML-enabled services based on the customer's usage. In one embodiment, the SAML configuration service 114 may determine the customer's usage of the services for some of the services provided by the network service provider. The number of services used for analyzing the customer's usage can be determined based on a specific application or computing resource. In some embodiments, the discovered SAML-enabled services can be transmitted to the customer computing device based on the prioritization. In some embodiments, the SAML configuration service 114 determines the customer's usage for each network service provider. In these embodiments, the SAML configuration service 114 may prioritize the network service providers based on the customer's usage. In addition, based on the prioritization, the SAML configuration service 114 may prioritize the discovered SAML-enabled services associated with the network service providers. For example, the SAML configuration service 114 can determine the prioritized list of the network service providers based on the customer's usage. Thus, the SAML configuration service 114 may transmit the SAML-enabled services included in the highest prioritized network service provider and then transmit the SAML-enabled services included in the second-highest prioritized network service provider, and so on.

At block 608, the SAML configuration service 114 may transmit the list of the discovered SAML-enabled services to the customer computing device 102. The sequence of transmitting the list of the discovered SAML-enabled services is based on the prioritization determined by analyzing the customer's usage pattern. This sequence in transmitting the list of services is advantageous because if there are a high number of discovered SAML-enabled services, the sequence can help the customer in selecting the services.

At block 610, if SAML configuration service 114 receives a customer's selection of service, the process can proceed to the block 612. In some embodiments, if the SAML configuration service 114 does not receive the customer's selection of service, the SAML configuration service routine 600 can end at block 614.

At block 612, the SAML configuration service 114 may configure the SAML configuration associated with the customer's selected services. Each of the SAML-enabled services may require a specific SAML configuration to provide permission to the customer to access to the services. In some embodiments, the SAML configuration service 114 identifies one or more parameters required to configure the SAML configuration of the selected services. The parameters can include authentication information, an entity ID, an authentication format or link, an identity provider service information, service provider metadata URL, etc. These parameters can be identified from the customer's authentication information received from the identity provider service 130. In some embodiments, the SAML configuration service 114 can be performed by mapping the identified parameters into the data format or specification of the SAML configuration of the selected services. In these embodiments, the SAML configuration service 114 may apply a parsing rule to map the identified parameters into the SAML configuration of the selected services. In addition, the identified parameters can be transmitted to the identity provider service 130, where the identity provider service also configures its parameters based on the SAML configuration of the selected services.

At block 614, the routine 600 can be ended, and the customer can access the selected services.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of customer computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable customer computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for facilitating Security Assertion Markup Language (SAML) accesses to network-based services, the system comprising:
one or more computing processors and memories for executing computer-executable instructions to implement a SAML configuration service, wherein the SAML configuration service is configured to:
obtain, from an identity provider service, a customer authentication information;
without user intervention, in response to receiving the authentication information from the identity provider service, discover a plurality of target SAML-enabled services by accessing one or more service providers with the customer authentication information, wherein the plurality of target SAML-enabled services are hosted in the one or more network service providers;
without user intervention, prioritize the discovered plurality of target SAML-enabled services, wherein the prioritization is based at least on the customer usage pattern of historically accessing each network service provider associated with the discovered SAML-enabled services;
provide a prioritized list of target SAML-enabled services, including the prioritized discovered plurality of target SAML-enabled services, to a customer computing device communicatively coupled with the system;
receive, from the customer computing device, at least one selection of target SAML-enabled services selected from the prioritized list of target SAML-enabled services;
without user intervention, in response to receiving the at least one selected target SAML-enabled services, identify one or more configuration parameters associated with SAML configuration of the at least one selected target SAML-enabled services; and
cause, without user intervention, an automatic initial configuration of SAML configurations associated with the at least one selected target SAML-enabled services based on the identified configuration parameters.

2. The system as recited in claim 1, wherein each network service provider of the one or more network service providers hosts one or more network-based services, the one or more network-based services comprising at least one SAML-enabled service.

3. The system as recited in claim 1, wherein the SAML configuration service further configured to parse the identified parameters to map into a data format associated with the SAML configuration of the selected SAML-enabled services.

4. The system as recited in claim 1, wherein the list of SAML-enabled services are determined based on, at least in part, analyzing historical usage of individual target SAML-enabled services of the plurality of target SAML-enabled services accessed by one or more customers included in a same organization.

5. The system as recited in claim 1, wherein the SAML configuration service causes configuration of SAML configurations associated with the at least one selected target SAML-enabled services based on the identified configuration parameters by transmitting the identified parameters to the identity provider service, wherein the identity provider service, based on the identified parameters, automatically configures SAML configurations.

6. A system for managing authentication of network-based services, the system comprising:
one or more computing processors and memories for executing computer-executable instructions to implement a SAML configuration service, wherein the SAML configuration service is configured to:
without user intervention, discover a set of target SAML-enabled services, wherein the set of target SAML-enabled services are hosted in the one or more network service providers, wherein the set of target SAML-enabled services are accessible by accessing the one or more network service providers with an authentication SAML-based authentication information provided by an identity provider service on behalf of identified customers;
provide a list of the set of discovered target SAML-enabled services to a customer computing device communicatively coupled with the system;
receive, from the customer computing device, at least one selection of a target SAML-enabled services from the provided list of target SAML-enabled services;
without user intervention, in response to receiving the at least one selected target SAML-enabled services, identify one or more parameters associated with a SAML configuration of the at least one selected SAML-enabled services; and
cause, without user intervention, an automatic initial configuration of the at least one selected SAML-enabled services according to SAML configurations based on the identified one or more parameters.

7. The system as recited in claim 6, wherein the SAML configuration service is further configured to prioritize the discovered set of target SAML-enabled service prior to provide the list of discovered target SAML-enabled services.

8. The system as recited in claim 7, wherein the list of target SAML-enabled services are discovered based on, at least in part, analyzing customer's historical usage of each of the SAML-enabled services.

9. The system as recited in claim 7, wherein the list of target SAML-enabled services are discovered based on, at least in part, on historical usage information associated with the one or more network service providers associated with a set of SAML-enabled services.

10. The system as recited in claim 7, wherein the historical usage information associated with a set of SAML-enabled services corresponds to historical usage information for a plurality of customers.

11. The system as recited in claim 6, wherein the SAML configuration service further configured to parse the identified parameters to map into a data format associated with the SAML configuration of the selected SAML-enabled services.

12. The system as recited in claim 6, wherein the SAML configuration service provides the list of the set of discovered target SAML-enabled services via a graphical user interface.

13. The system as recited in claim 6, wherein the SAML configuration service identify identifies one or more parameters associated with a SAML configuration of the at least one selected SAML-enabled services based on customer preference information.

14. The system as recited in claim 6, wherein the SAML configuration service identifies a set of target SAML-enabled services from a plurality of service providers.

15. The system as recited in claim 6, wherein the SAML configuration service is implemented by a service provider independent of at least one service provider hosting one or more the target SAML-enabled services.

16. The system as recited in claim 6, wherein the SAML configuration service is implemented by a service provider also hosting one or more the target SAML-enabled services.

17. A computer-implemented method for managing authentication services in accordance with Security Assertion Markup Language (SAML) based communications, the method comprising:

without user intervention, identifying a set of target SAML-enabled services, wherein the set of target SAML-enabled services are hosted in the one or more network service providers, wherein the set of target SAML-enabled services are accessible by accessing the one or more network service providers with an authentication SAML-based authentication information provided by an identity provider service on behalf of identified customers;

without user intervention, processing the identified set of target SAML-enabled services to generate a list of target SAML-enabled services;

providing the list of target SAML-enabled services to a customer computing device communicatively coupled with the system;

receiving, from the customer computing device, at least one selection of a target SAML-enabled service from the list of target SAML-enabled services; and causing, without user intervention, an initial configuring SAML configurations associated with the selected SAML-enabled services.

18. The computer-implemented method of claim 17 further comprising parsing the identified parameters to map into a data format associated with the SAML configuration of the selected SAML-enabled services.

19. The computer-implemented method of claim 17, wherein the list of SAML-enabled services are determined based on, at least in part, analyzing customer's historical usage of each of the SAML-enabled services.

20. The computer-implemented method of claim 17, wherein processing the identified set target SAML-enabled service includes prioritizing the identified set of target SAML-enabled services based on the customer usage pattern associated with the discovered SAML-enabled services.

21. The computer-implemented method of claim 17, wherein identifying a set of target SAML-enabled services, wherein the set of target SAML-enabled services are accessible with an authentication SAML-based authentication information provided by an identity provider service on behalf of identified customer includes identifying a set of target SAML-enable services hosted by a plurality of service providers.

22. The computer-implemented method of claim 17 further comprising causing the generation of at least graphical user interface configured to obtain the selection of the at least target SAML-enabled service from the list of target SAML-enabled services.

* * * * *